Jan. 18, 1955   M. FOURESTIER ET AL   2,699,770
ENDOSCOPE
Filed May 9, 1952   2 Sheets-Sheet 1

Jan. 18, 1955  M. FOURESTIER ET AL  2,699,770
ENDOSCOPE
Filed May 9, 1952  2 Sheets-Sheet 2

United States Patent Office 2,699,770
Patented Jan. 18, 1955

2,699,770

ENDOSCOPE

Max Fourestier, Vanves, Amédée Joseph Gladu, Liancourt, and Jacques Claude Vulmière, Pre Saint-Gervais, France, assignors to Centre National de la Recherche Scientifique, Paris, France, a corporation of France Application May 9, 1952, Serial No. 287,056

Claims priority, application France May 11, 1951

3 Claims. (Cl. 128—6)

Endoscopy has proved to be a valuable means of investigation and this method, at the present time, is often used by physicians and surgeons. However, the difficulty of illuminating the cavities which are under observation hinders its generalization.

Illuminating is generally obtained by means of bulbs placed inside the cavity. When the orifice of access is of a small diameter, the bulbs have to be minute and it becomes necessary to overload them to a very large degree, which considerably decreases their effective life, in order that the illumination be acceptable. In spite of this, it is difficult to take photographies at the bottom of the cavities which are under observation and it is practically impossible to take colour-photographies.

Various attempts have been made to use various optical systems allowing the use of external light sources, but the presently known devices are complicated and bulky and do not enable a treatment or an operation to be carried out while observing the inside of the cavity.

On the other hand, a great inconvenience is experienced, in practice, through the reek caused by the patient's breathing, and which deposits on the front lens. Trouble is also caused by reflections and diffusion occurring inside the support of the optical device.

The present invention obviates these drawbacks.

One of its essential features consists in that the apparatus comprises a tube for entering the cavity to be observed and along and inside which a rod of transparent material is placed receiving, at one of its ends, the radiation issuing from an external light source, said radiation undergoing, along the rod, multiple total reflections and issuing therefrom through the end located inside the cavity to be observed.

Another feature consists in that the light source is lateral and the radiation enters the transparent rod after having been deflected by a mirror or total reflection prism, thus enabling the possibility of introducing the necessary tubes or instruments into the tube.

Another feature is that the rod of transparent material may be metal plated, except at its ends, and the end through which issues the radiation is preferably ground and bevelled.

One characteristic also resides in the fact that the inside of the cavity is observed either with the naked eye or by means of a Galileo viewer. By adopting a device separating the light beams, two viewers can be used, thus allowing a simultaneous observation by two persons.

Another feature of the invention is the fact that the apparatus is provided with a reek-suppressing device and coloured filters and polarizing slabs.

One characteristic further consists in means enabling the stray light which is often important and troublesome to be strongly decreased.

Finally, according to the invention, the viewer or viewers may be replaced by a photographic camera or by a cinematographic recording camera with a reflex system, the views being taken with or without the adjunction of an optical system increasing the field and located inside the endoscopic tube.

The invention is applicable to all kinds of endoscopic devices such as those used in pleuroscopy, cystoscopy, gastroscopy etc.

The invention will now be described with reference to the appended drawings which disclose a preferred embodiment thereof.

Figure 1:
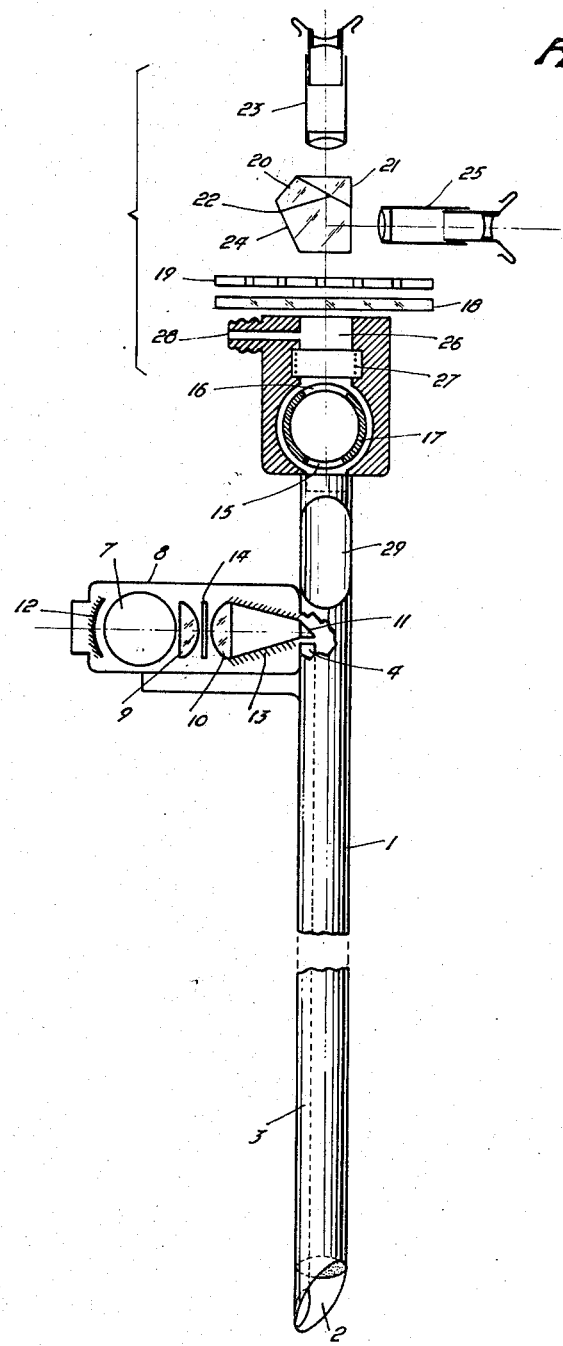
Fig. 1 is a diagrammatic section through a plane through the axis of a bronchoscope according to the invention.
Figure 2:
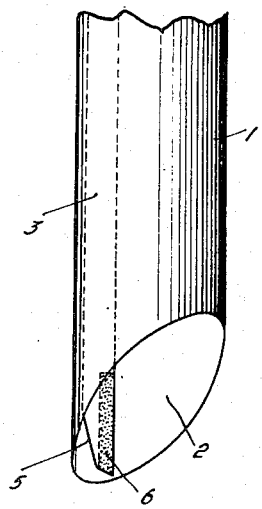
Fig. 2 is a view, on a larger scale, of the end of an endoscopic tube and of the rod used for transmitting the light.

The portion which is introduced in the bronchia consists of a tube 1, hereinafter called a "bronchoscopic tube." It should be very rigid and is made, for example, of special steel, chromium plated on the outside. Its lower end 2 is cut in a bevel and, contrarily to the bronchoscopic tubes used at present, it offers no outside protrusion. It can thus be rotated on itself without causing any suffering to the patient. In order that reflections on the walls be made negligible, the inside of the tube is made mat by sandblasting or threading and/or blackened by oxidizing or a suitable chemical treatment. The end 2, on the contrary, is polished and made reflecting, so as to increase the illumination of the observed surfaces.

The illumination of the bronchia is effected by means of a rod 3 of transparent material such as quartz of Plexiglas, placed inside tube 1, along a generatrix. The end 4 of this rod is polished and cut perpendicularly to the axis.

The other end, placed inside the bronchia, is beveled, polished and silvered in the area 5 adjacent tube 1, while the surface portion 6 opposite this bevel, is finely ground to increase the aperture of the lighting beam. The light rays entering the rod through its end 4 are propagated in the transparent medium and those which are not directed along the axis are reflected on the walls of the rod owing to total reflection phenomena. Taking into account absorption phenomena, all the light which entered end 4 issues through end 6 and the aperture of the output and input beam are the same. Bevel 5, polished and silvered, sends back the light received, towards the center of the field.

The condensation of water vapour issued from the patient's breathing modifies the total reflection phenomena, and it is therefore preferable to silver rod 3, except, obviously, at the upper end 4 and at portion 6 of the lower end.

In practice, rod 3 will be placed in a sheath secured inside the bronchoscopic tube.

The light radiation going through rod 3 is produced by a bulb 7 located in a box 8 secured on a platform associated with the bronchoscopic tube. This bulb will be, for instance a bulb of the automobile type, 6 volts, 5 amps., with a concentrated filament (2 x 2 mm.). In some cases, a very high luminosity is necessary and it is then sufficient to overload the bulb. Its life will be shorter but this drawback is a minor one since these lamps are inexpensive and are common in trade.

The produced light is concentrated by means of a condenser with as high an aperture as possible. A condenser with an f/0.9 aperture formed of two plano-convex lenses 9 and 10 with elliptical surfaces will be advantageously used. These lenses, which are now made without any difficulty, are placed bulge to bulge. They will preferably be cut in a highly transparent glass, with a low dispersion and capable of withstanding temperature variations.

Upon issuing from the condenser, the beam is concentrated on a total reflection prism 11 which deflects the radiation by 90° and sends it into rod 3.

The efficiency of the device may be further increased by placing the filament of bulb 7 at the center of curvature of a concave mirror 12.

In addition, there may be placed, at the output of the condenser, a funnel shaped member, as shown a polished metal cone 13 which collects the aberrant rays or the rays coming from the unused ends of the filament and thus increases the luminosity and the aperture of the beam.

Such a device provides a sufficient internal illumination to allow colour-photographies and moving picture films to be taken.

In order to avoid heating at the input to the rod, a biplanar catathermal glass 14 is used. Further, the inside of box 8 is polished and gilded so as to offer a high and constant reflection factor in the infra-red and an air circulation cools the unit.

In the axis of tube 1 and at some distance above prism 11 is the optical observation device. This device is associated with tube 1. The light coming from the observed area goes through tube 1, passes through two apertures 15 and 16 provided in an obturating shutter 17 and after going through a protecting glass 18 and, if need be, a coloured filter 19, reaches a beam separator. This separator consists of two elements 20 and 21, of transparent material, separated by a surface 22 which is partly transparent and partly reflecting. Part of the rays from the bronchoscopic tube goes, without any deviation, through elements 20 and 21 of the separator and enters a Galileo viewer 23. The other part of the rays is reflected on surface 22, undergoes a second reflection on the silvered face 24 of element 20 and, thus deflected by 90° goes out of the separator and enters a second Galileo viewer 25. The image is right side up and the assistant who looks through viewer 25 has a vision which is identical with that of the doctor who is observing through viewer 23. In general, things are arranged so that the transmission factor of surface 22 be higher than its reflection factor.

The observed images are enlarged images, which greatly facilitates carrying on with the work and, in general, each viewer provides two magnifications.

The separator and viewers are effaceable, which allows observation with the naked eye if desired.

The obturating shutter 17 is used during the coughing spells. It is controlled by the foot, through an electric wire and a small electro-magnet, not shown in the drawing.

Between this shutter and the optical device proper is a vapour eliminating chamber 26. The air therein is heated by an electric resistor 27 and sucked in through a hose 28.

The plane transparent glass 18, water repellent on its front face, protects the optical device from the mucus projected by the patient. It is advantageous to have two similar glasses mounted on one slide so that during an operation, one of them may be rapidly substituted for another with a removal and cleaning of the fouled glass.

After the protecting glass is a slide where either a colour filter 19 or a rotating polarizing slab can be placed.

The very high brilliancy of the field obtained with the lighting device which is an object of the invention allows the observation of the bronchia in coloured light.

Preferably, as a filter 19, a red absorbing filter is chosen. It then becomes easy to discern some inflammations of the mucous membranes which are scarcely visible in white light.

In some particular cases, it is interesting to suppress the vitrous reflection on the shiny parts of the mucus. A polarizing slab which is given a suitable orientation is then placed on the path of the light rays.

To take a photography or moving pictures, the separator 20—21 is taken off, as well as the viewers, and a long focus camera is adapted, with a "reflex" chamber. If it is desired to widen the photographic field, one can introduce, in the bronchoscopic tube, a suitable optical system. Such systems are known for visual observation. They have not been used, up to this date, for taking pictures, as the luminosity of endoscopes used nowadays is not sufficient. The illuminating system which is an object of the invention makes it possible to obviate this.

The field is not uniformly illuminated, since all its points are not at the same distance from the luminous end 6 of rod 3. Several pictures are then taken with different exposure times. In order to decrease extraneous reflections to a minimum, it is preferable to coat all optical surfaces with anti-reflecting coatings.

The device which is an object of the invention not only allows visual observation and the photographies to be taken but it also makes it possible to make interventions during observation.

To this effect, the bronchoscopic tube offers an aperture 29, located between the total reflection prism 11 and the observation optical device. It is through this aperture that the necessary instruments are introduced: biopsy pinchers, electric cautery, etc.

A small plane mirror may also be introduced, secured at the end of a rod, the whole being arranged in such a manner that the mirror can assume any orientation and thus reflects the light issuing from rod 3 in the desired direction. It also enables a panoramic observation of radial bronchia to be made.

It is advantageous to permanently secure, in the sheath which contains rod 3:

(a) A tube providing a continuous suction. This limits the vapour which is deposited on the front portion of the optical system of the endoscope and eliminates the fluid mucosities which may accumulate at the end of the tube. This is indispensable in case an optical system, going all the way down the bronchoscopic tube is made use of, for taking pictures;

(b) A tube for vaporizing an anaesthetic liquid. This allows an immediate anaesthesia at the most suitable moment.

The presence of the suction device and of the vaporizer during observation, decreases the number of manipulations and consequently reduces the duration of the operation.

Figure 3:
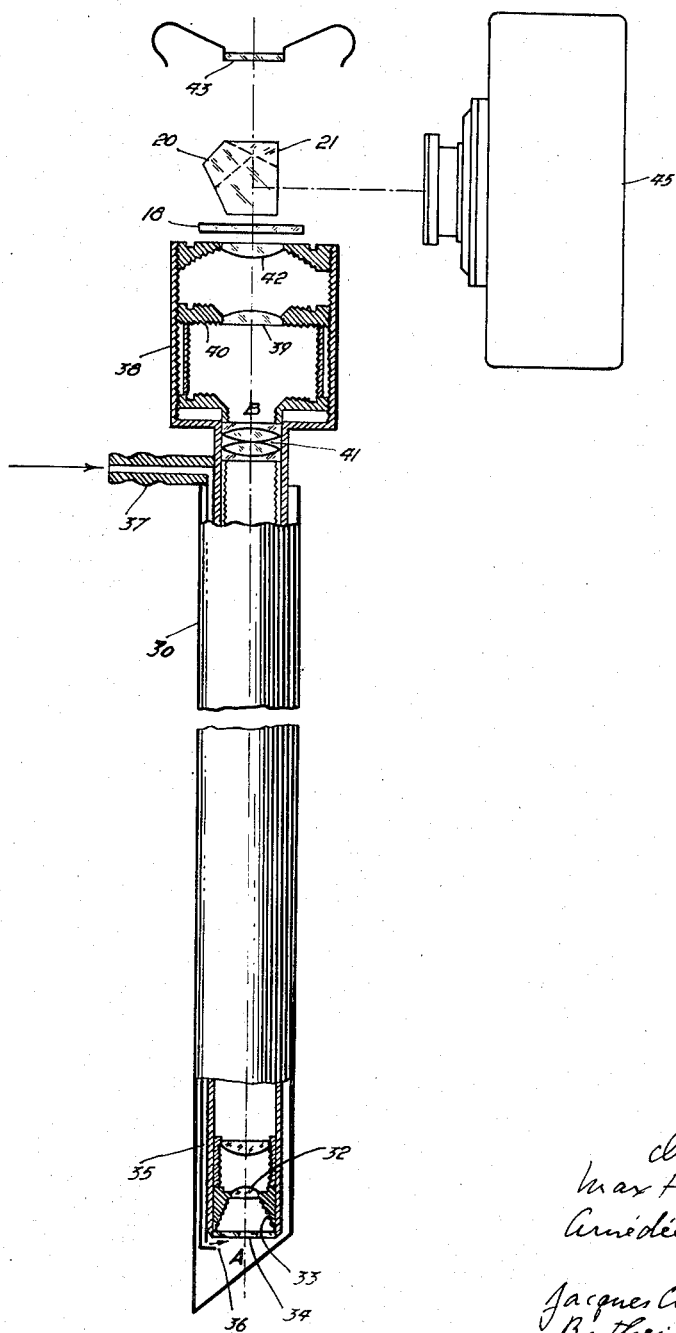
Fig. 3 is a section view, in elevation of a device simultaneously providing ocular vision and photography.

In another form of the optical device allowing observation or pictures to be taken (Fig. 3), said device consists in a tube 30 which can be introduced in the bronchoscope 1, just described, or which may be used directly as a bronchoscope.

An optical system AB of a type known per se is introduced into tube 30.

This system, however, offers the following particular features: The front lens 32 is not flush with the end 33 of the device. It is driven inside as much as possible without this withdrawal however decreasing the field of the instrument. The end 33 is stopped by a slab of fused silica 34, more resistant to corrosion and to scoring than glass. It is swept by a light, constantly renewed air draught, coming from outside through tube 35 and escaping through a side aperture 36, the inclination and shape of which are such that the air draught forms, as much as possible, a sheet over the surface of slab 34. The air is blown in by any known means such as a rubber bulb or a small fan connected to the end 37 of hose 35.

The output is adjusted by any means (needle valve, cock, clamp on rubber, etc.).

In order to practically eliminate stray light, all the inner walls of the optical system AB are striated and blackened. In addition, at the upper portion of the optical system, a casing 38 is secured, the inner surfaces of which are striated and blackened and which comprises an eye piece provided with a field lens 39 fast with a diaphragm 40.

The last vehicle 41 of the optical system AB provides, of the object to be examined, an image which forms in the plane of the field lens 39. The diaphragm 40 limits its useful portion. The eye piece is completed by a lens 42 and lenses 39 and 42 are arranged and designed in such a manner that the image of the last vehicle 41 is formed on the pupil 43 provided with a silica glass, for instance.

An image separator 20—21 makes it possible to simultaneously observe the phenomenon and take photographies or moving pictures. To this effect, a camera 45 is adapted on one of the beams.

A light filter, polarizing slabs, stoppers, diaphragms, etc., may be provided as described with reference to Fig. 1.

What we claim is:

1. An apparatus for endoscopic examination of cavities, comprising a tube having a lower open end adapted to penetrate inside the cavity to be examined and an upper part adapted to remain outside said cavity, optical means located in said upper part for observing said cavity through said tube, a light conducting rectilinear rod made of transparent material and having an axis extending longitudinally inside said tube, said rod having a bevelled end in the vicinity of the said open end of said tube and an opposite end in said upper part of said tube, said opposite end being perpendicular to the axis of said tube, an illuminating system arranged laterally of the upper part of said tube and comprising an illuminating source, a condenser having a large numerical aperture, and a reflecting surface adapted to direct along the axis of said light conducting rod a light beam issuing axially from said condenser, said illuminating system being adapted to form an image of the illuminating source in close proximity to that end of said rod which is perpendicular to the axis of said tube.

2. An apparatus as claimed in claim 1, in which said illuminating system is enclosed in a casing having a metallised, polished inner surface.

3. An apparatus as claimed in claim 1, in which a funnel shaped member having a metallised, polished inner surface is disposed between said condenser and said reflecting surface, said funnel shaped member having a wide end turned towards said condenser and a narrow end turned towards said reflecting surface.

References Cited in the file of this patent

UNITED STATES PATENTS

| Number | Name | Date |
|---|---|---|
| 1,551,770 | Palmeter | Sept. 1, 1925 |
| 1,640,096 | Rosenstein | Aug. 23, 1927 |
| 1,677,016 | Berry | July 10, 1928 |
| 2,186,143 | Neugass | Jan. 9, 1940 |
| 2,235,979 | Brown | Mar. 25, 1941 |

FOREIGN PATENTS

| Number | Country | Date |
|---|---|---|
| 483,158 | Germany | Sept. 30, 1929 |
| 525,978 | France | Sept. 29, 1921 |
| 709,732 | Germany | Aug. 24, 1941 |